United States Patent [19]
Maison

[11] 3,875,177
[45] Apr. 1, 1975

[54] PROCESS FOR THE MANUFACTURE OF BIS(BENZOT HIAZYLSULPHENE)AMIDES

[75] Inventor: Jean-Marc Maison, Paris, France

[73] Assignee: Rhone-Poulenc S.A., Paris, France

[22] Filed: Apr. 27, 1973

[21] Appl. No.: 355,005

Related U.S. Application Data

[63] Continuation of Ser. No. 110,745, Jan. 28, 1971, abandoned.

[30] Foreign Application Priority Data
Jan. 30, 1970 France .............................. 70.03351

[52] U.S. Cl................ 260/306.6 A, 260/4, 260/785
[51] Int. Cl............................................ C07d 91/48
[58] Field of Search............................. 260/306.6 A

[56] References Cited
UNITED STATES PATENTS
2,860,142 11/1958 Conly........................... 260/306.6 A Primary Examiner—Richard J. Gallagher
Attorney, Agent, or Firm—Stevens, Davis, Miller & Mosher

[57] ABSTRACT

Bis-(benzothiazylsulphene)amides of formula:

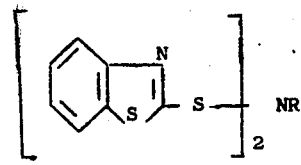

where R is a hydrocarbon radical, are obtained by treating a benzothiazylsulpheneamide of formula:

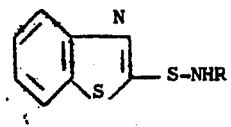

with an organic acid anhydride having a structural formula which includes at least one ring, e.g., phthalic or maleic anhydride.

6 Claims, No Drawings

PROCESS FOR THE MANUFACTURE OF BIS(BENZOTHIAZYLSULPHENE)AMIDES

This is a continuation of application Ser. No. 110,745, filed Jan. 28, 1971, and now abandoned.

The present invention relates a new process for the manufacture of bis-(benzothiazylsulphene)amides.

Bis-(benzothiazylsulphene)amides have been described in U.S. Pat. Spec. No. 2,321,305 and are useful as accelerators for the vulcanisation of natural or synthetic rubbers.

The present invention provides a process for the preparation of bis-(benzothiazylsulphene)amides of general formula:

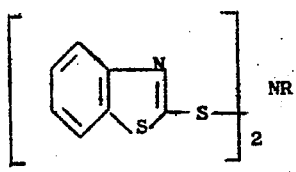

in which the symbol R represents a hydrocarbon radical, by reaction of a benzothiazylsulpheneamide of general formula:

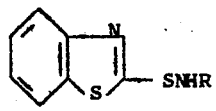

with an organic acid anhydride having a structural formula which includes at least one ring.

In the anhydrides of cyclic formula, a ring can be bonded to the acyl group, for example in aromatic carboxylic acid anhydrides such as benzoic anhydride. The ring can also originate from two carboxyl groups in an intramolecular anhydride, such as anhydrides of aliphatic dicarboxylic acids containg 4 to 6 carbon atoms (for example maleic, succinic or glutaric anhydrides). Condensed polycyclic anhydrides can also be used; these are intramolecular anhydrides of aromatic carboxylic acids such as phthalic anhydride and pyromellitic anhydride.

It is preferred that R represent a linear or branched alkyl radical of 1 to 12 carbon atoms, such as methyl, ethyl, isopropyl, t-butyl, t-octyl or dodecyl, or a cycloalkyl radical with 5 to 6 ring carbon atoms such as cyclopentyl or cyclohexyl.

The reaction takes place in accordance with the following equation:

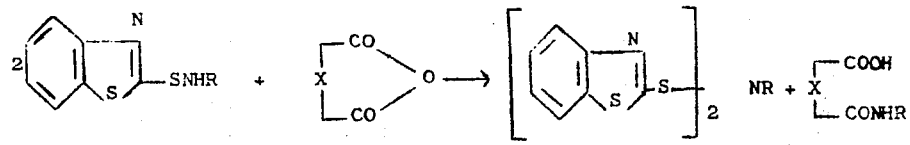

where —CO—X—CO— represents either a diacyl radical or two monovalent cyclic acyl radicals.

The reaction temperature depends on the reagents used, particularly their heat stability, their melting point and their reactivity and, where a solvent is employed, their solubility. A suitable reaction temperature is generally between 35° and 120°C, and preferably between 60° and 110°C. If the process is carried out in the absence of solvents, the reaction takes place rather rapidly and within a small volume which gives a high productivity for the apparatus.

Reaction between reagents which are solid at the reaction temperature can be improved by carrying out the process in the presence of a solvent which is inert towards the reagents under the conditions employed. Suitable solvents include hydrocarbons such as cyclohexane, benzene, aliphatic petrols, n-heptane or halogenated solvents where the halogen atom is of low reactivity, such as carbon tetrachloride or chlorobenzene. If the solvent boils at the temperature used, it will be convenient to carry out the process so that the vapours of the solvent reflux.

A molar ratio of monosulpheneamide/anhydride group of about 2 is used. Generally, a slight excess of anhydride (for example up to about 10%) allows the yield relative to the more costly product, the monosulpheneamide, to be improved. Furthermore, this allows a final product almost free of monosulpheneamide to be obtained. The starting monosulpheneamide can contain up to 10% of impurities without disadvantage.

It is not essential for the reaction medium to be homogeneous to obtain the bis-(benzothiazylsulphene)amide. Furthermore, traces of water do not unfavourably affect either the yield or the quality of the product obtained.

The crude reaction product, freed of solvent if used, can be used as such as an accelerator for the vulcanisation of rubber mixtures, because the impurities present are practically inert towards rubber and only behave as diluents. However, if desired, the greater part of the reaction by-products (acid amide, or amide and acid) can easily be removed, as can a possible excess of anhydride, by a treatment with alkali. For this purpose, the crude reaction product can be subjected to the action of aqueous alkaline solution, e.g., an alkali metal hydroxide solution or an ammonia solution, at about 10° to 30°C; the bis(benzothiazylsulphene)amide remains insoluble in this medium, whilst the other products present pass into solution.

The bis(benzothiazylsulphene)amides obtained according to the process of the invention show a high storage stability, make possible high vulcanisation speeds with great safety in use, and impart advantageous mechanical properties (tensile strength and elongation at break, and modulus at 300%) to the vulcanised products.

The Examples which follow illustrate the invention.

EXAMPLE 1

82 g of phthalic anhydride (0.55 mol) and 264 g of cyclohexylbenzothiazylsulpheneamide of 98% purity (representing 0.98 mol) are introduced cold into a mixer equipped with a heating jacket, and then stirred. The temperature of the mixture is raised to 100°C and maintained at that temperature for 30 minutes; the mass thickness, becomes pasty and then solidifies and crumbles.

The crumbled mass is cooled to 20°C. The mixture obtained, which melts at between 120° and 140°C, consists of excess phthalic anhydride, cyclohexylphthalamic acid and N-cyclohexyl-bis-(benzothiazylsulphene)amide. This mixture is treated with 1.1 litres of a normal aqueous sodium hydroxide solution for 2 hours at 20°C. Filtration, washing and drying gives 202 g of cyclohexyl-bis-(benzothiazylsulphene)amide, melting 132°–133°C. The yield is 93.8% relative to the crude N-cyclohexylbenzothiazylsulpheneamide.

The impurities in the crude product for practical purposes do not cause any reduction in the activity of the purified product, as is shown by the comparative vulcanisation test described below:

The following mixing formulation (composition by weight) is used.

TABLE I

| | |
|---|---|
| Smoked natural rubber sheets | 50 |
| SBR 1500 (styrene-butadiene copolymer) | 50 |
| Zinc oxide | 5 |
| Stearic acid | 1 |
| SRF carbon black (semi-reinforcing furnace) | 15 |
| FEF carbon black (fast extrusion furnace) | 30 |
| Plasticiser (predominantly naphthenic oil, marketed under the trademark NAPTOLEN) | 5 |
| Resin (diolefine polymer marketed under the trademark ESCOREZ) | 2 |
| Micro-crystalline wax (mixture of aliphatic hydrocarbons) | 1 |
| Trimethyldihydroquinoline polymer | 0.5 |
| N-Isopropyl-N'-phenyl-p-phenylenediamine | 1 |
| Insoluble sulphur | 2 |
| N-Cyclohexyl-bis(benzothiazylsulphene)amide | See Table II |

The following results are obtained (Table II).

TABLE II

| Cyclohexyl-bis(benzothiazylsulphene)amide | MOONEY scorching time at 130°C. (minutes) | Vulcanisation in a press at 145°C. | |
|---|---|---|---|
| | | optimum (in minutes) | 300% modulus (kg/cm²) |
| Product of Example 1, melting at 120–140°C (1.8 part) | 47 | 41 | 89 |
| Product of Example 1 purified by an aqueous alkaline treatment melting at 132–133°C. (1 part) | 50 | 42 | 91 |

The products melting at 120°–140°C and at 132°–133°C show substantially the same safety against scorching as the chemically pure product obtained by recrystallisation from dimethylformamide and melting at 136°C. When 1 part of the pure product, melting at 136°C, is used under the conditions of Table II, the MOONEY scorching time is 51.5 minutes, indicating that the impurities in the product prepared according to the present process behave simply as inert diluents.

EXAMPLE 2

1,000 cm³ of carbon tetrachloride, 82 g of phthalic anhydride (0.55 mol) and 264 g of cyclohexylbenzothiazylsulpheneamide of 98% strength (0.98 mol) are introduced into a flask equipped with a stirring device. The mixture is heated at the reflux temperature (80°C within the mixture) for 2 hours, the reaction mass is then cooled to 20°C and the reaction mixture is treated with 1.1 litres of a normal aqueous sodium hydroxide solution for 2 hours at 20°C. The phthalic anhydride and the cyclohexylphthalamic acid pass into the aqueous phase and the carbon tetrachloride phase is separated off. Evaporation of the carbon tetrachloride gives 204 g of cyclohexyl-bis-(benzothiazylsulphene)amide melting at 131°–132°C, representing a yield of 95.1% relative to the crude cyclohexylbenzothiazylsulpheneamide.

EXAMPLE 3

82 g of phthalic anhydride (0.55 mol) and 238 g of t-butyl-benzothiazylsulpheneamide of 98% purity (representing 0.98 mol) are introduced cold into a mixer equipped with a heating jacket and stirred. The temperature of the mixture is raised to 100°C and maintained at that temperature for 1 hour. The mass initially thickens, becomes pasty and then solidifies and crumbles. The resulting mixture of phthalic anhydride, t-butylphthalamic acid and t-butyl-bis(benzothiazylsulphene)-amide is cooled to about 20°C.

This mixture is treated with 1.1 litres of a normal aqueous sodium hydroxide solution for 2 hours at 20°C. The bis-(sulphene)amide is filtered off, washed and dried. 194 g of t-butyl-bis-(benzothiazylsulphene)amide, melting at 141°C, is obtained in a yield of 96% relative to the crude t-butyl-benzothiazylsulpheneamide.

EXAMPLE 4

54 g of maleic anhydride (0.55 mol) and 264 g of cyclohexylbenzothiazylsulpheneamide of 96.8% purity (representing 0.968 mol) are introduced cold into a mixer equipped with a heating jacket, and stirred. The temperature of the mixture is raised to 60°C and maintained at that temperature for 50 minutes. The mass liquefies, becomes deep green and then pasty, and thereafter solidifies and crumbles.

The resulting light beige mixture, melting at about 110°, and consisting of excess maleic anhydride, cyclohexylmaleamic acid and N-cyclohexyl-bis(benzothiazylsulphene)amide, is cooled to 20°C. This mixture is treated with 1.1 litres of a normal aqueous sodium hydroxide solution for 2 hours at 20°C. Filtration, washing and drying yields 198 g of cyclohexyl-bis-(benzothiazylsulphene)amide melting at 130°C. The yield is 92.4% relative to the crude N-cyclohexylbenzothiazylsulpheneamide.

EXAMPLE 5

The procedure of Example 4, is repeated replacing the usual technical cyclohexylbenzothiazylsulpheneamide by a technical product of the same nature which has deteriorated as a result of long storage and is now only of 92.9% purity, 195 g of cyclohexyl-bis-(benzothiazylsulphene)-amide, melting at 128°–130°C, are obtained, representing a yield of 90.9% relative to the crude N-cyclohexylbenzothiazylsulpheneamide employed.

EXAMPLE 6

54 g of maleic anhydride (0.55 mol) and 238 g of t-butylbenzothiazylsulpheneamide of 92.2% purity (representing 0.922 mol) are introduced cold into a mixer equipped with a heating jacket and stirred. The temperature of the mixture is raised to 100°C and maintained at that temperature for ½ hour. The mass becomes liquid and then thickens, solidifies and crumbles. The resulting mixture of maleic anhydride, t-butyl-maleamic acid and t-butyl-bis-(benzothiazylsulphene)amide is cooled to about 20°C.

This mixture is treated with 1.1 litres of a normal aqueous sodium hydroxide solution for 2 hours at 20°C. The bis-(sulphene)amide is filtered off, washed and dried. 192 g of t-butyl-bis-(benzothiazylsulphene)amide, melting at 138°–139°C, are obtained, in a yield of 95.2% relative to the crude t-butyl-benzothiazylsulpheneamide employed.

EXAMPLE 7

54 g of maleic anhydride (0.55 mol) and 224 g of isopropylbenzothiazylsulpheneamide of 94.3% purity (representing 0.943 mol) are introduced cold into a mixer equipped with a heating jacket and stirred. The temperature of the mixture is raised to 60°C and maintained at that temperature for 1 hour 20 minutes. The mass liquefies and then cools and crumbles in the mixer.

The light beige mixture obtained, which consists of maleic anhydride, isopropylmaleamic acid and isopropyl-bis-(benzothiazylsulphene)-amide is cooled to 20°C. This mixture is treated with 1.1 litres of a normal aqueous sodium hydroxide solution at 20° for 2 hours.

Filtration, washing and drying yields 173 g of isopropyl-bis-(benzothiazylsulphene)amide melting at 100°C, representing a yield of 89% relative to the crude N-isopropylbenzothiazylsulpheneamide employed.

EXAMPLE 8

If, in place of working at 60°C as in Example 7, the process is carried out at 40°C, all other aspects being the same, the duration of the reaction must be extended to 4 hours 10 minutes (in place of 1 hour 20 minutes). After treatment with sodium hydroxide, 180 g of isopropyl-bis-(benzothiazylsulphene)amide, melting at 101°C, are obtained, representing a yield of 93% relative to the crude N-isopropylbenzothiazylsulpheneamide (of 94.3% purity) employed.

EXAMPLE 9

60 g of pyromellitic anhydride (0.275 mol) and 264 g of cyclohexylbenzothiazylsulpheneamide of 98.1% purity (0.98 mol) are introduced cold into a mixer equipped with a heating jacket, and stirred. The temperature of the mixture is raised to 100°C and maintained at that temperature for 2 hours. The mass becomes pasty and then again hardens, whilst still remaining pasty. After cooling to 20°C., it slowly solidifies. This crude mixture is thereafter treated with 1.1 litres of a normal aqueous sodium hydroxide solution for 2 hours at 20°C. Filtration, washing and drying yields 207 g of cyclohexyl-bis-(benzothiazylsulphene)amide, melting at 126°–127°C. This represents a yield of 96.3% relative to the crude cyclohexylbenzothiazylsulpheneamide employed.

I claim:

1. Process for preparing a bis-(benzothiazylsulphene)amide of general formula:

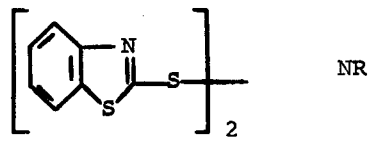

in which R is alkyl of 1 to 12 carbon atoms, cyclopentyl or cyclohexyl; wherein a benzothiazylsulpheneamide of general formula:

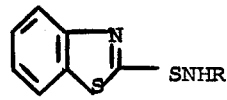

is reacted with maleic anhydride, succinic anhydride, glutaric anhydride, phthalic anhydride, or pyromellitic anhydride.

2. A process according to claim 1 wherein the molar ratio of benzothiazylsulpheneamide to anhydride groups is substantially 2:1.

3. A process according to claim 1 wherein the reaction is carried out in the presence of an inert solvent.

4. A process according to claim 1 wherein the reaction product is treated with an aqueous alkaline solution and the insoluble bis-(benzothiazylsulphene)amide separated form the solution containing impurities.

5. A process according to claim 1 wherein a benzothiazylsulpheneamide in which R represents cyclohexyl, isopropyl or tert.-butyl is heated at 60°–110°C in the presence of about ½ a molar proportion of phthalic anhydride or maleic anhydride or about ¼ of a molar proportion of pyromellitic anhydride for about ½ to 2 hours.

6. A process according to claim 5 wherein the reaction product is washed with an aqueous sodium hydroxide solution at about 10° to 30°C and the insoluble bis-(benzothiazylsulphene)amide separated from the solution containing impurities.

* * * * *